US012555554B2

(12) United States Patent
Dai et al.

(10) Patent No.: US 12,555,554 B2
(45) Date of Patent: Feb. 17, 2026

(54) ANTI-DIZZINESS DISPLAY METHOD, PROCESSING DEVICE, AND INFORMATION DISPLAY SYSTEM

(71) Applicant: Industrial Technology Research Institute, Hsinchu (TW)

(72) Inventors: Hong-Ming Dai, Tainan (TW); Ya-Rou Hsu, Miaoli County (TW); Chien-Ju Lee, Taoyuan (TW); Chun-Yen Huang, Taichung (TW); Kuan-Ting Chen, Yunlin County (TW); Yu-Hsiang Tsai, Hsinchu County (TW); Chia-Hsun Tu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 18/596,679

(22) Filed: Mar. 6, 2024

(65) Prior Publication Data

US 2024/0379075 A1    Nov. 14, 2024

Related U.S. Application Data

(60) Provisional application No. 63/465,864, filed on May 11, 2023.

(30) Foreign Application Priority Data

Dec. 12, 2023    (TW) .................................. 112148209

(51) Int. Cl.
*G09G 5/37*    (2006.01)
*G06F 3/01*    (2006.01)
(Continued)

(52) U.S. Cl.
CPC .............. *G09G 5/37* (2013.01); *G06F 3/013* (2013.01); *G06F 3/14* (2013.01); *G06V 10/44* (2022.01);
(Continued)

(58) Field of Classification Search
CPC ........ G09G 5/37; G09G 5/14; G09G 2354/00; G09G 2380/10; G06F 3/013; G06F 3/14;
(Continued)

(56) References Cited

U.S. PATENT DOCUMENTS 5,742,264 A * 4/1998 Inagaki .................. G09G 5/397
348/E5.145
5,966,680 A * 10/1999 Butnaru ................ A61M 21/00
702/150

(Continued)

FOREIGN PATENT DOCUMENTS

CN    106167045    11/2016
CN    112654959    4/2021
(Continued)

OTHER PUBLICATIONS

"Office Action of Taiwan Counterpart Application", issued on Aug. 29, 2024, p. 1-p. 5.
(Continued)

*Primary Examiner* — Adam J Snyder
(74) *Attorney, Agent, or Firm* — JCIPRNET

(57) ABSTRACT

An anti-dizziness display method, a processing device, and an information display system are proposed. The information display system is configured to display on a mobile vehicle and includes a first display, a transportation environment information acquisition device, and a processing device. The transportation environment information acquisition device is configured to obtain transportation environment information of the mobile vehicle. The processing device is configured to perform the following operations. A visual feedback magnitude is determined according to the transportation environment information, and the visual feedback magnitude varies in response to variation of the transportation environment information. A display image of the first display is controlled according to the visual feedback
(Continued)

magnitude, so that the display image of the first display changes in response to the variation in the transportation environment information.

17 Claims, 13 Drawing Sheets

(51) Int. Cl.
*G06F 3/14* (2006.01)
*G06V 10/44* (2022.01)
*B60K 35/00* (2006.01)
*B60K 35/22* (2024.01)
*B60K 35/28* (2024.01)
*B60K 35/29* (2024.01)
*G09G 5/14* (2006.01)

(52) U.S. Cl.
CPC .............. *B60K 35/00* (2013.01); *B60K 35/22* (2024.01); *B60K 35/28* (2024.01); *B60K 35/29* (2024.01); *G09G 5/14* (2013.01); *G09G 2354/00* (2013.01); *G09G 2380/10* (2013.01)

(58) Field of Classification Search
CPC ........ G06V 10/44; B60K 35/00; B60K 35/22; B60K 35/28; B60K 35/29
See application file for complete search history.

(56) References Cited

U.S. PATENT DOCUMENTS

| | | | |
|---|---|---|---|
| 6,932,090 B1 | 8/2005 | Reschke et al. | |
| 7,128,705 B2* | 10/2006 | Brendley | A61M 21/00 348/148 |
| 7,918,781 B1* | 4/2011 | Smyth | G06F 3/012 600/27 |
| 8,690,750 B2 | 4/2014 | Krueger | |
| 10,849,496 B2 | 12/2020 | Murakami et al. | |
| 2002/0099257 A1* | 7/2002 | Parker | G06F 3/011 600/27 |
| 2004/0100419 A1* | 5/2004 | Kato | G09G 5/00 345/7 |
| 2008/0122737 A1* | 5/2008 | Lea | G06F 1/1613 345/11 |
| 2009/0002142 A1 | 1/2009 | Morimoto et al. | |
| 2012/0289767 A1* | 11/2012 | Yeh | A61M 21/00 600/27 |
| 2013/0038599 A1* | 2/2013 | Krakowski | G06F 3/0481 345/589 |
| 2014/0268356 A1* | 9/2014 | Bolas | G02B 27/017 359/630 |
| 2014/0362113 A1* | 12/2014 | Benson | G06F 3/012 345/633 |
| 2019/0025580 A1 | 1/2019 | Nagano et al. | |
| 2019/0269321 A1* | 9/2019 | Murakami | A61B 5/165 |
| 2022/0020119 A1* | 1/2022 | Grace | B60K 35/28 |
| 2022/0238083 A1 | 7/2022 | Sasayama et al. | |
| 2023/0015904 A1* | 1/2023 | Esnault | B60K 35/22 |
| 2023/0131693 A1 | 4/2023 | Oda et al. | |

FOREIGN PATENT DOCUMENTS

| | | |
|---|---|---|
| CN | 114398120 | 4/2022 |
| CN | 114730232 | 7/2022 |
| JP | 2018524223 | 8/2018 |
| JP | 7086307 | 6/2022 |
| TW | I596542 | 8/2017 |
| TW | 202014771 | 4/2020 |
| TW | 202248810 | 12/2022 |
| TW | I790738 | 1/2023 |

OTHER PUBLICATIONS

"Search Report of Europe Counterpart Application", issued on Sep. 19, 2024, p. 1-p. 13.

* cited by examiner

ANTI-DIZZINESS DISPLAY METHOD, PROCESSING DEVICE, AND INFORMATION DISPLAY SYSTEM

CROSS-REFERENCE TO RELATED APPLICATION

The application claims the priority benefit of U.S. provisional application Ser. No. 63/465,864, filed on May 11, 2023 and Taiwan application serial no. 112148209, filed on Dec. 12, 2023. The entirety of each of the patent applications is hereby incorporated by reference herein and made a part of the specification.

BACKGROUND

Technical Field

The disclosure relates to an information display technology.

Description of Related Art

With the advancement of science and technology, display devices have become commonly seen in the daily lives of the general public, and modern people may view display devices on various occasions. For example, viewing a display of a personal electronic device while riding a mobile vehicle or viewing a display installed on a mobile vehicle are quite common situations. However, when a viewer watches a display image on a mobile vehicle, the viewer often feels dizzy due to the shaking and/or movement of the mobile vehicle. One reason is that when viewers view the display image on a mobile vehicle, the movement perceived by the visual system is inconsistent with the actual body movement, which may cause dizziness. Alternatively, when a mobile vehicle is moving, uneven road surfaces may cause viewers to feel bumps, which puts stress on the visual system and causes dizziness.

For window screen display systems on mobile vehicle, transparent displays may be used to display anti-dizziness reference images to reduce the dizziness of viewers. However, for non-transparent displays displayed on mobile vehicle, if the same method is used to improve the viewer's dizziness, the anti-dizziness reference image may obscure the displayed content, thus reducing the viewing experience.

SUMMARY

In an exemplary embodiment of the disclosure, an information display system for displaying on a mobile vehicle includes a first display, a transportation environment information acquisition device, and a processing device. The processing device is connected to the first display and the transportation environment information acquisition device. The transportation environment information acquisition device is configured to acquire transportation environment information of the mobile vehicle. The processing device is configured to perform the following operations. The visual feedback magnitude is determined according to the transportation environment information, and the visual feedback magnitude varies in response to variation of the transportation environment information. A display image of the first display is controlled according to the visual feedback magnitude, so that the display image of the first display changes in response to the variation of the transportation environment information.

In an exemplary embodiment of the disclosure, an anti-dizziness display method is adapted to an information display system including a first display. The information display system is configured to display on a mobile vehicle, and the anti-dizziness display method includes the following steps. Transportation environment information of the mobile vehicle is obtained. A visual feedback magnitude is determined according to the transportation environment information, and the visual feedback magnitude varies in response to variation of the transportation environment information. A display image of the first display is controlled according to the visual feedback magnitude, so that the display image of the first display changes in response to the variation of the transportation environment information.

In an exemplary embodiment of the disclosure, a processing device is connected to a first display and a transportation environment information acquisition device. The processing device includes a memory and a processor connected to the memory. The memory is configured to store data, and the processor is configured to perform the following operations. Transportation environment information of the mobile vehicle is obtained. A visual feedback magnitude is determined according to the transportation environment information, and the visual feedback magnitude varies in response to variation of the transportation environment information. A display image of the first display is controlled according to the visual feedback magnitude, so that the display image of the first display changes in response to the variation of the transportation environment information.

BRIEF DESCRIPTION OF THE DRAWINGS

The accompanying drawings are included to provide further understanding, and are incorporated in and constitute a part of the specification. The drawings illustrate exemplary embodiments and, together with the description, serve to explain the principles of the disclosure.

Figure 12A:
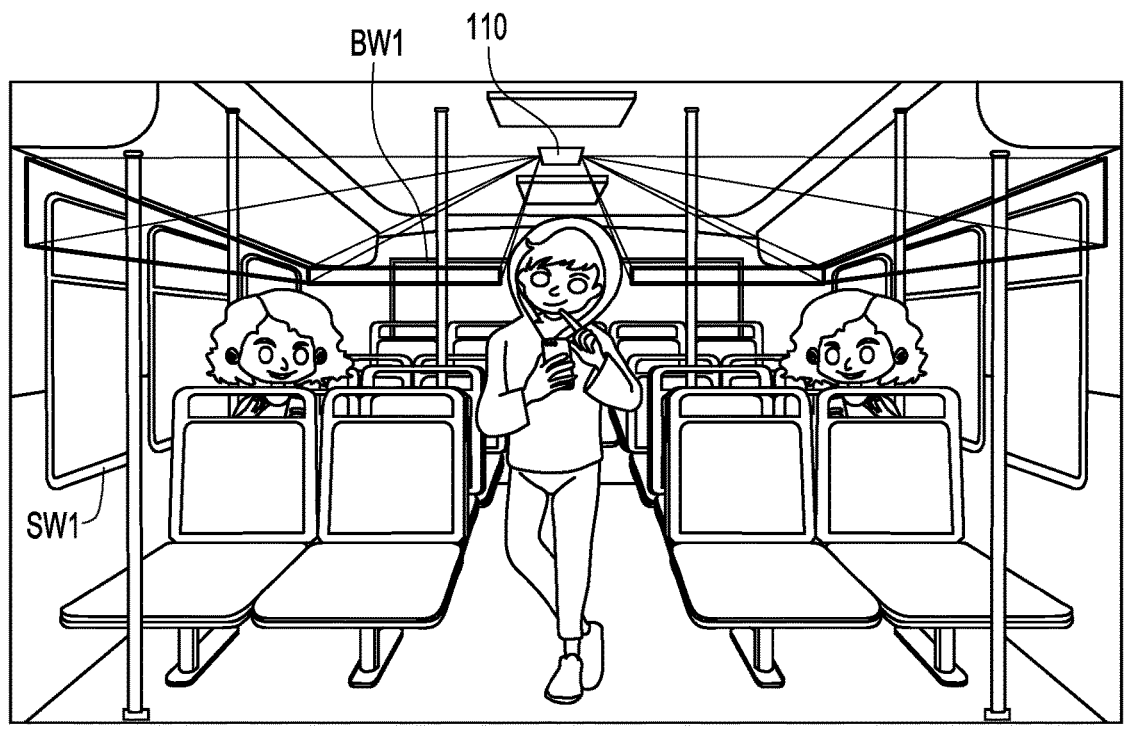
Figure 12B:
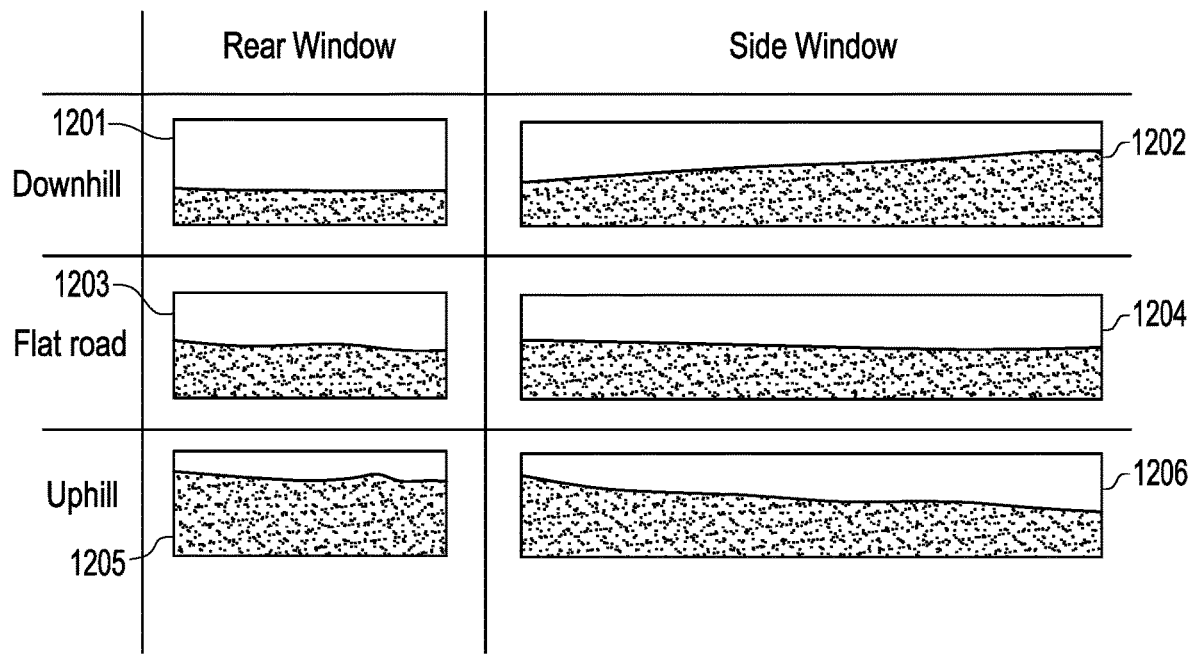

12A and FIG. 12B are schematic diagrams illustrating a scenario of displaying an anti-dizziness pattern according to an exemplary embodiment of the disclosure.

Figure 13:
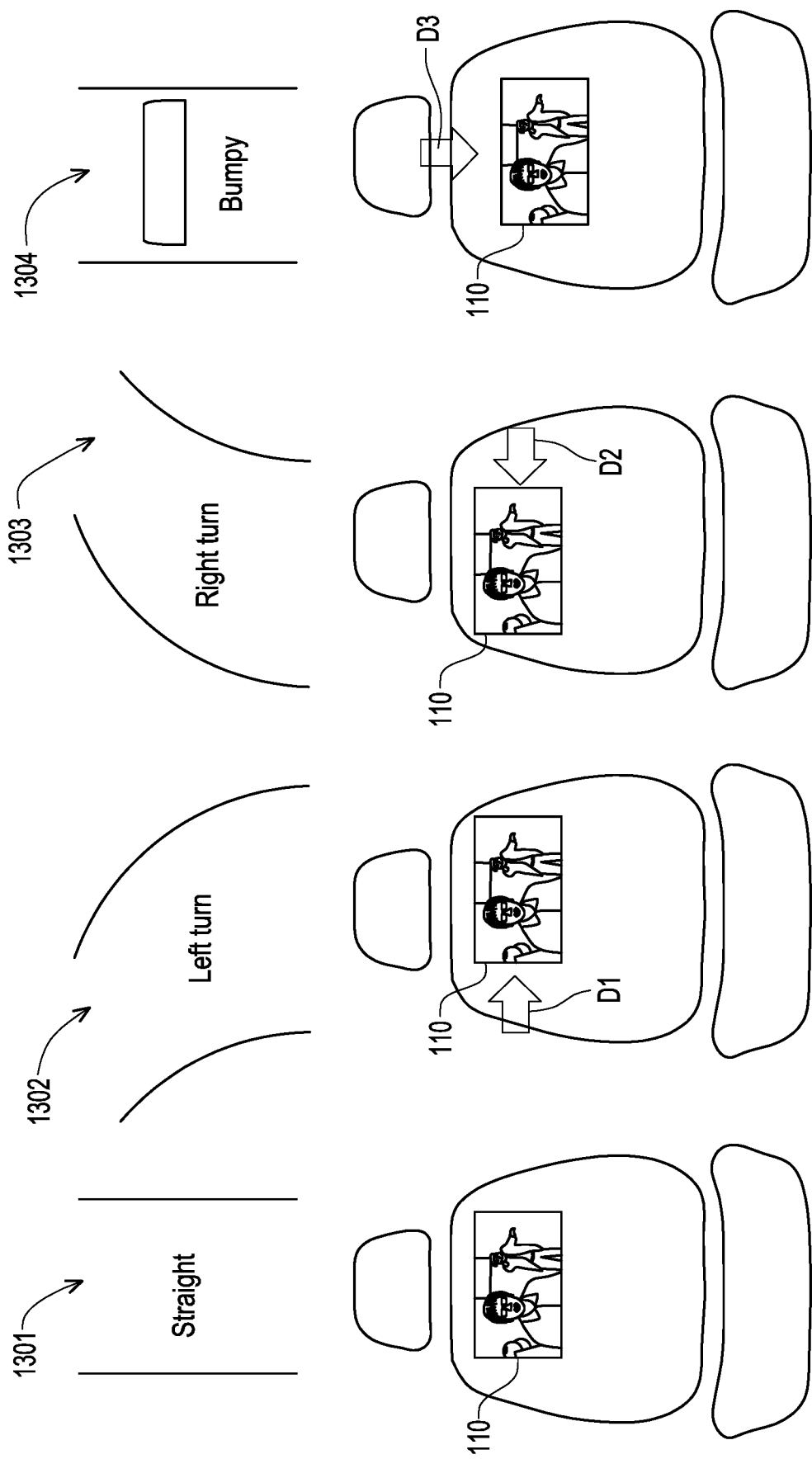

FIG. 13 is a schematic diagram of adjusting the position of the display image according to transportation environment information according to an exemplary embodiment of the disclosure.

Figure 14:
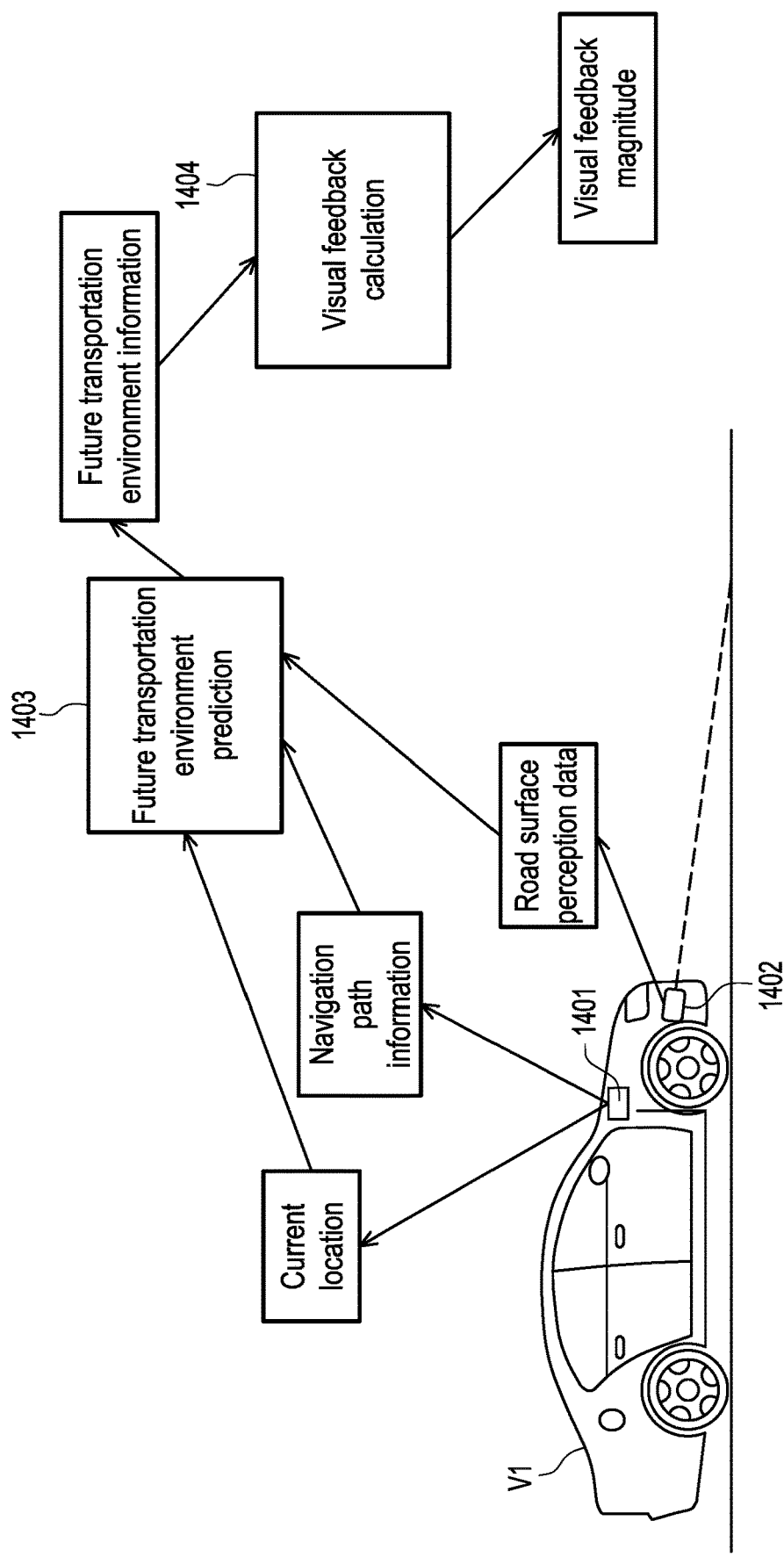

FIG. 14 is a schematic diagram of determining the visual feedback magnitude according to future transportation environment information according to an exemplary embodiment of the disclosure.

DESCRIPTION OF THE EMBODIMENTS

Some exemplary embodiments of the disclosure will be described below with reference to the accompanying drawings. The component symbols cited in the following description will be regarded as the same or similar components when the same component symbols appear in different drawings. These exemplary embodiments are only part of the disclosure and do not disclose all possible implementations of the disclosure. Rather, these exemplary embodiments are only examples of methods, devices, and systems within the scope of the patent application of the disclosure.

Figure 1A:
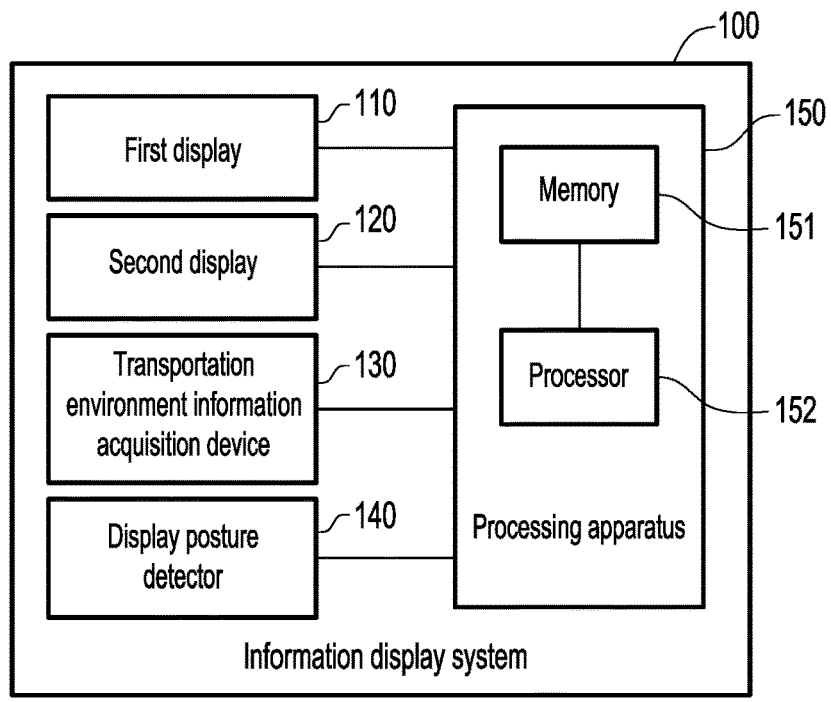
FIG. 1A and FIG. 1B are block diagrams of an information display system according to exemplary embodiments of the disclosure.
Figure 1B:
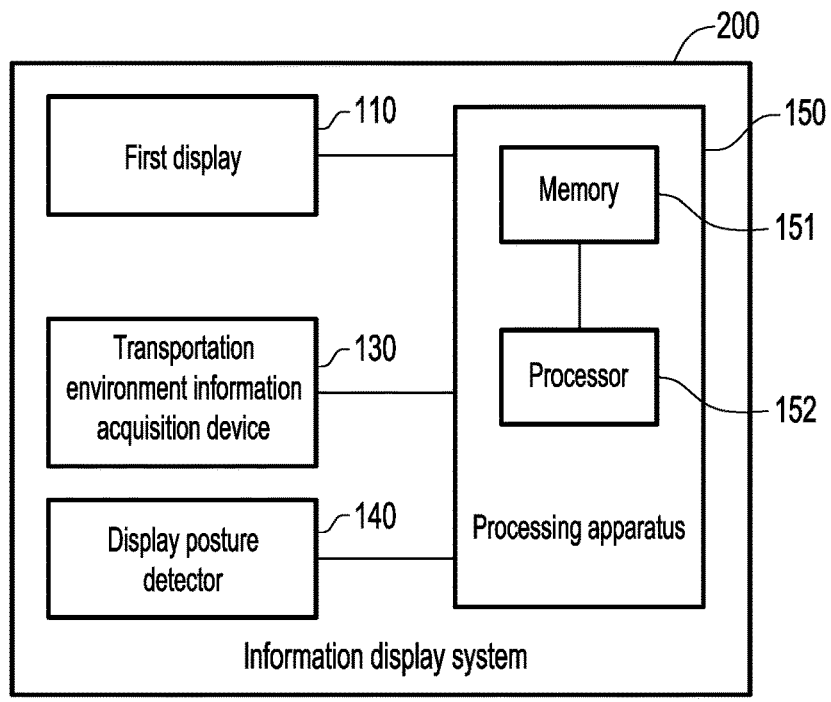

FIGS. 1A and 1B are block diagrams of an information display system according to an exemplary embodiment of the disclosure.

With reference to FIG. 1A first, the information display system 100 in the exemplary embodiment is adapted to displaying on a mobile vehicle. The mobile vehicle may be a transportation vehicle or an entertainment machine, etc., such as a scooter, car, bus, tour bus, MRT, train, AR cockpit, VR cockpit, airplane, light rail, ship, cable car, high-speed railway train or submarine etc. The information display system 100 may include a first display 110, a second display 120, a transportation environment information acquisition device 130, a display posture detector 140 and a processing device 150. The processing device 150 may be wirelessly, wired or electrically connected to the first display 110, the second display 120, the transportation environment information acquisition device 130 and the display posture detector 140.

The first display 110 and the second display 120 may be configured to display information, including, for example, a liquid crystal display (LCD), a field sequential color (Field sequential color) liquid crystal display, or a light emitting diode (LED), an organic light emitting diode (OLED) displays, an electrowetting displays, or projection displays, which is not limited in the disclosure. In some embodiments, the first display 110 may be a light display device composed of a light emitting diode (LED).

The transportation environment information acquisition device 130 is configured to acquire transportation environment information of the mobile vehicle. In some embodiments, the transportation environment information acquisition device 130 may include one or more inertial measurement unit sensors (IMU sensors). The inertial sensor may be installed on the mobile vehicle. Alternatively, the inertial sensor may be installed on a portable display device of a user riding the mobile vehicle. The portable display device is, for example, a mobile phone, a tablet computer, a notebook computer, a game console, etc. of a user riding the mobile vehicle, and the disclosure is not limited thereto. The inertial sensor is, for example, an acceleration sensor, a gyroscope or a g-sensor, etc.

In some embodiments, the transportation environment information acquisition device 130 may include one or more image sensors. The image sensor may be configured to capture images and includes a camera lens with a lens and a photosensitive element. In some embodiments, the image sensor may be installed on the mobile vehicle and may capture the actual scene outside the mobile vehicle to generate a transportation environment image. Alternatively, in some embodiments, the image sensor may be installed on a portable display device of a user riding a mobile vehicle. An image sensor (such as a front lens image sensor) installed on a portable display device may sense a user to generate an image of the user. Alternatively, an image sensor (such as a rear lens image sensor) installed on the portable display device may sense the actual scene inside the mobile vehicle to generate an internal image of the vehicle. In different embodiments, the image sensor may include a visible light sensor or a non-visible light sensor such as an infrared sensor.

In some embodiments, the transportation environment information acquisition device 130 may include a navigation and positioning device. The navigation and positioning device may be configured to generate location information of the mobile vehicle. The positioning device 130 may be, for example, a GPS locator, a Gyro compass, a magnetic compass, an electronic compass, an altitude sensor, or the like. In addition, the navigation and positioning device may provide navigation path information of the mobile vehicle.

In some embodiments, the transportation environment information acquisition device 130 may include a wireless communication device. The wireless communication device receives transportation environment information of the mobile vehicle. The wireless communication device may include a transceiver that supports a wireless communication standard, such as a Bluetooth communication standard, a Wi-Fi communication standard, a mobile communication standard (such as a 4G communication standard or a 5G communication standard) or other wireless communication standards, which is not limited in the disclosure. The transportation environment information acquisition device 130 may be connected to a network (such as the Internet of Vehicles or a mobile communication network) or other communication devices to receive transportation environment information of mobile vehicle.

The display posture detector 140 is configured to detect the display posture of the first display 110 or the second display 120. For example, the display posture detector 140 may be a g-sensor that is capable to detect the angle between the display plane of the first display 110 or the second display 120 and the ground plane. Alternatively, the display posture detector 140 may be a tilt sensor, which may detect the tilt state of the first display 110 or the second display 120.

The processing device 150 is configured to control the operation of the information display system 100, and may include a memory 151 and a processor 152. The memory 151 may be, for example, any type of fixed or removable random access memory (random access memory, RAM), read-only memory (read-only memory, ROM), flash memory (flash memory), Hard disk or other similar device, integrated circuit, or combination thereof. The processor 152 may be, for example, a central processing unit (CPU), an application processor (AP), or other programmable general-purpose or special-purpose microprocessor, digital signal processing digital signal processor (DSP), image signal processor (ISP), graphics processing unit (GPU) or other similar devices, integrated circuits or combinations thereof.

In the embodiment of FIG. 1A, the information display system 100 may display an anti-dizziness pattern according to transportation environment information to improve the user's dizziness feeling. The display image of the first display 110 includes the anti-dizziness pattern, and the second display 120 is configured to display a main screen. The anti-dizziness pattern may, for example, be displayed around or on at least one side of the main frame. It should be noted that, in some embodiments, the first display 110 and the second display 120 may be the same display device. That is, the anti-dizziness pattern and the main screen may be displayed in different display areas of a single display device. For example, the edge display area of the display device may be configured to display the anti-dizziness pattern, while the center display area of the same display device may be configured to display the main screen. Alternatively, in some embodiments, the first display 110 and the second display 120 may be two different display devices. The display device including the first display 110 may be disposed around or on at least one side of another display device including the second display 120. The processing device 150 may determine the visual feedback magnitude according to the transportation environment information, and determine the image characteristics of the anti-dizziness pattern of the first display 110 according to the visual feedback magnitude. The image characteristics may include pattern shape, pattern size, pattern color, pattern brightness or pattern angle of the anti-dizziness pattern, etc.

With reference to FIG. 1B, the information display system 200 in the exemplary embodiment is configured to display on a mobile vehicle. The mobile vehicle may be a transportation vehicle or an entertainment machine, etc., such as a scooter, car, bus, tour bus, MRT, train, AR cockpit, VR cockpit, airplane, light rail, ship, cable car, high-speed railway train or submarine etc. The information display system 200 may include a first display 110, a transportation environment information acquisition device 130, a display posture detector 140 and a processing device 150. The implementation details of the transportation environment information acquisition device 130, the display posture detector 140 and the processing device 150 are similar to the embodiment of FIG. 1A and will not be described again here.

It should be noted that, in the embodiment of FIG. 1B, the information display system 200 may perform image processing methods such as image shift or image deformation on the main screen according to the transportation environment information to improve the user's dizziness. That is, the information display system 200 does not include a display for displaying anti-dizziness patterns. The first display 100 may be configured to display the main screen. The processing device 150 may determine the visual feedback magnitude according to the transportation environment information, and perform image processing such as image shift or image deformation on the main screen displayed on the first display 100 according to the visual feedback magnitude.

In the following exemplary embodiment, each component of the information display system 100 and 200 will be configured to illustrate the process of the anti-dizziness display method performed by the processing device 150.

Figure 2:
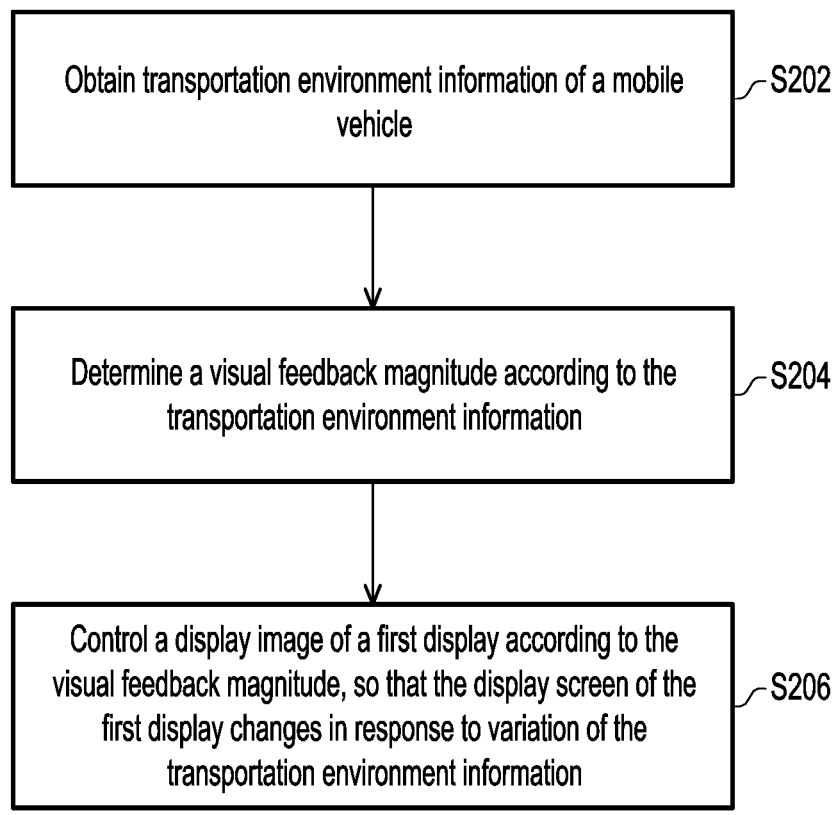
FIG. 2 is a flowchart of an anti-dizziness display method according to an exemplary embodiment of the disclosure.

FIG. 2 is a flow chart of an anti-dizziness display method according to an exemplary embodiment of the disclosure. With reference to FIG. 1A, FIG. 1B and FIG. 2 together, the method flow of FIG. 2 may be performed by the information display system 100 of FIG. 1A or FIG. 1B information display system 200.

In step S202, the processing device 150 obtains the transportation environment information of the mobile vehicle through the transportation environment information acquisition device 130. The transportation environment information may include, for example, the shaking state, speed state, turning direction, lean state or road surface state of the mobile vehicle. The transportation environment information may also include, for example, navigation path information and the current location of the mobile vehicle, etc. For example, the processing device 150 may obtain the acceleration value or shaking value of the mobile vehicle through an inertial sensor.

In step S204, the processing device 150 determines visual feedback magnitude according to the transportation environment information. The visual feedback magnitude may vary in response to variation of the transportation environment information. The visual feedback magnitude is corresponding to the variation amplitude of the image characteristics of the anti-dizziness pattern.

In some embodiments of FIG. 1A that the pattern characteristics of the anti-dizziness pattern is varied in response to variation of the transportation environment information, the visual feedback magnitude includes a pattern variation amount of the anti-dizziness pattern displayed on the first display 110. That is, in some embodiments, the processing device 150 determines the pattern variation amount of the anti-dizziness pattern according to the transportation environment information. The main screen may be a multimedia screen or an application program screen, etc. The shape of the anti-dizziness pattern may be, for example, U-shaped, straight-line-shaped, square-shaped, or other shapes.

In some embodiments of the main screen changes in response to variation of the transportation environment information in FIG. 1B, the visual feedback magnitude includes the image shift amount and image deformation amount of the display image displayed by the first display 110. The main screen may be a multimedia screen or an application program screen, etc. That is, in some embodiments, the processing device 150 determines the image shift amount or image deformation amount of the display image displayed by the first display 110 according to the transportation environment information.

In step S206, the processing device 150 controls the display image of the first display 110 according to the visual feedback magnitude, so that the display image of the first display 110 changes in response to the variation of the transportation environment information. Therefore, by using the anti-dizziness pattern presented on the first display 110 to prompt the variation of the transportation environment information of the mobile vehicle, the user may know the motion status of the mobile vehicle and reduce the feeling of dizziness. Alternatively, through the deformation or shift of the main screen of the first display 110, the shift amount or the degree of deformation of the displayed content relative to the user may be reduced, thereby improving the dizziness.

In some embodiments, when the second display 120 displays the main screen, the processing device 150 controls the first display 110 to display the anti-dizziness pattern around or on at least one side of the main screen according to the pattern variation amount. Therefore, the pattern characteristics of the anti-dizziness pattern may change as the transportation environment information varies, so that the user may watch the changes in the anti-dizziness pattern to perceive the variation of the transportation environment information, thereby reducing the dizziness of the user when viewing the displayed content on the mobile vehicle. In some embodiments, the processing device 150 controls the display image of the first display 110 to shift according to the image offset amount. The processing device 150 controls the display image of the first display 110 by performing image deformation transformation according to the image deformation amount. Therefore, the main screen displayed on the first display 110 may deformed as the transportation environment information varies, thereby reducing the user's dizziness when viewing the displayed content on the mobile vehicle.

Figure 3A:
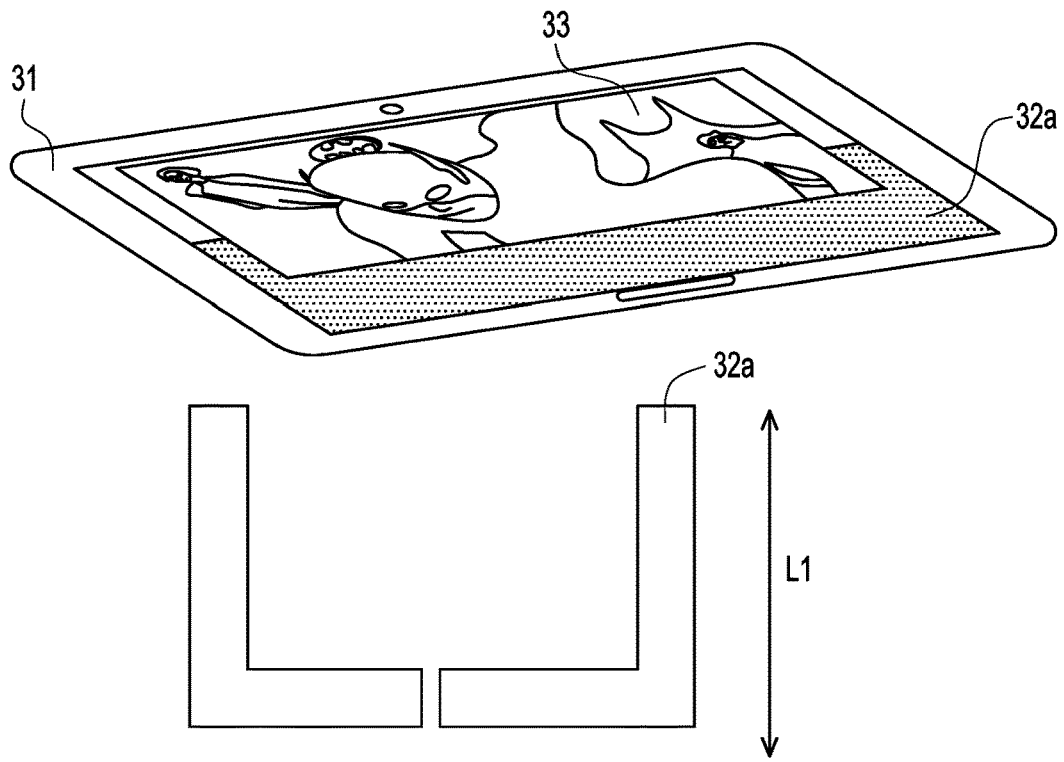
FIG. 3A and FIG. 3B are schematic diagrams illustrating anti-dizziness patterns according to an exemplary embodiment of the disclosure.
Figure 3B:
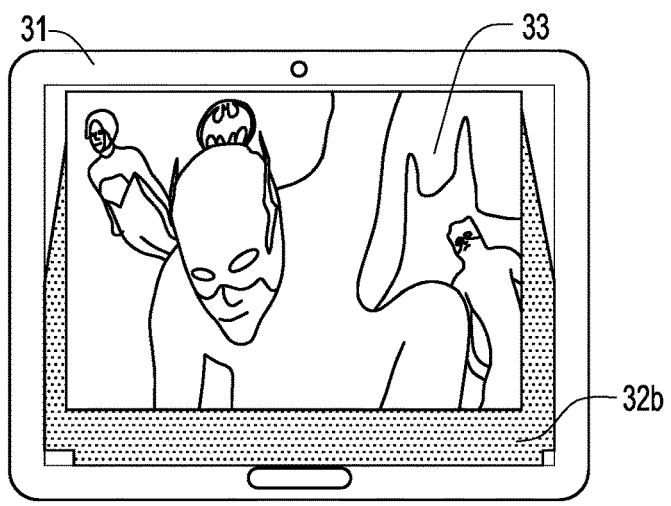
Figure 3B:
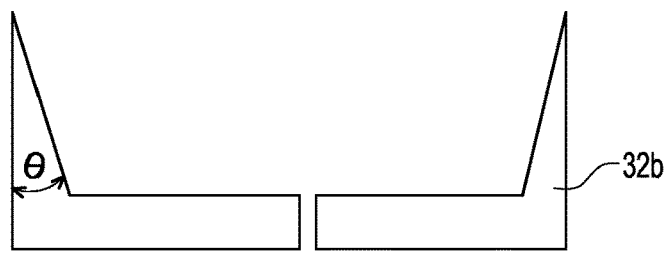

FIG. 3A and FIG. 3B are schematic diagrams showing anti-dizziness patterns according to an exemplary embodiment of the disclosure. With reference to FIG. 1A, FIG. 3A and FIG. 3B, in an embodiment, the second display 120 for displaying the main screen 33 and the first display 110 for displaying the anti-dizziness patterns 32a and 32b are the same portable display device 31. Anti-dizziness patterns 32a and 32b are displayed around the main screen 33. The processing device 150 may determine the pattern variation amount of the anti-dizziness patterns 32a and 32b according to the transportation environment information. Therefore, when the central display area of the portable display device 31 displays the main screen 33, the processing device 150 controls the portable display device 31 to display the anti-dizziness patterns 32a and 32b around the main screen 33 according to the pattern variation amount.

In the embodiment of FIG. 3A, the pattern variation amount may include the pattern length variation amount. The anti-dizziness pattern 32a includes at least one strip pattern, such as the two strip patterns located on the left and right sides of the main screen 33 in FIG. 3A. The processing device 150 may adjust the length L1 of the strip pattern of the anti-dizziness pattern 32a according to the pattern length variation. That is, the length L1 of the anti-dizziness pattern 32a may be extended or shortened in response to the variation of the transportation environment information. For example, in response to the moving vehicle being in an acceleration state or a deceleration state, the length L1 of the anti-dizziness pattern 32a may be extended or shortened in response to speed variation.

In the embodiment of FIG. 3B, the pattern variation amount may include the pattern angle variation amount. The anti-dizziness pattern 32b includes at least one bevel pattern. The processing device 150 may adjust the angle θ of the bevel pattern of the anti-dizziness pattern 32b or the angle pointing direction of the bevel pattern according to the pattern angle variation amount. That is, the angle θ of the anti-dizziness pattern 32b may become larger or smaller in response to variation of the transportation environment information. The angle pointing direction of the anti-dizziness pattern 32b may change in response to variation of the transportation environment information. For example, in response to the moving vehicle being in an acceleration state or a deceleration state, the angle θ of the anti-dizziness pattern 32b may become larger or smaller in response to changes in the speed state.

In addition, in some embodiments, the display posture detector 140 is configured to detect the display posture of the second display 120. The processing device 150 may determine the pattern shape of the anti-dizziness pattern according to the display posture of the second display 120.

Taking FIG. 3A and FIG. 3B as an example, the display posture detector 140 is configured to detect the display posture of the portable display device 31. The display posture may include a horizontal display posture and an upright display posture. For example, when the angle difference between the display surface of the portable display device 31 and the ground plane is small enough (for example, being within the first numerical range), the display posture of the portable display device 31 may be regarded as a horizontal display posture. On the contrary, when the angle difference between the display surface of the portable display device 31 and the ground plane is large enough (e.g., being within the second numerical range), the display posture of the portable display device 31 may be regarded as an upright display posture.

As shown in FIG. 3A, when the display orientation of the portable display device 31 is a horizontal display posture, the processing device 150 determines that the anti-dizziness pattern 32a includes strip patterns located on both sides of the main screen 33. As shown in FIG. 3B, when the display orientation of the portable display device 31 is an upright display posture, the processing device 150 determines that the anti-dizziness pattern 32 b includes bevel patterns located on both sides of the main screen 33. In other words, the processor 150 may also determine the pattern shapes of the anti-dizziness patterns 32a and 32b according to the display posture of the portable display device 31, so that the change of the anti-dizziness patterns may be more comply with the user's intuition and improve the user's dizziness feeling.

Figure 4A:
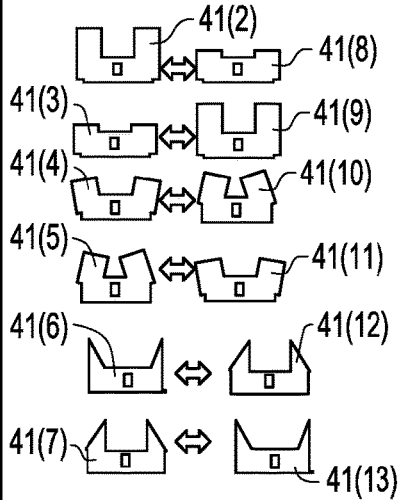
FIG. 4A and FIG. 4B are schematic diagrams illustrating anti-dizziness patterns according to an exemplary embodiment of the disclosure.
Figure 4B:
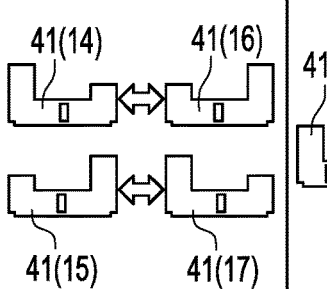

FIG. 4A and FIG. 4B are schematic diagrams of anti-dizziness patterns according to an exemplary embodiment of the disclosure. Embodiments of FIG. 4A and FIG. 4B provide multiple examples of different variations of anti-dizziness patterns, but the disclosure is not limited thereto.

With reference to FIG. 4A, when the mobile vehicle is in a stationary or smooth moving state, the first display 110 may display an anti-dizziness pattern 41(1). For example, when the mobile vehicle is in an acceleration state, the first display 110 may display the anti-dizziness patterns 41(2), 41(3), 41(4), 41(5), 41(6) or 41(7). Correspondingly, when the mobile vehicle is in a deceleration state, the first display 110 may display the anti-dizziness patterns 41(8), 41(9), 41(10), 41(11), 41(12) or 41(13). For example, when the mobile vehicle is in a left-leaning state, the first display 110 may display the anti-dizziness pattern 41(14) or 41(15). Correspondingly, when the mobile vehicle is in a right-leaning state, the first display 110 may display the anti-dizziness pattern 41(16) or 41(17). Comparing the anti-dizziness pattern 41(14) and the anti-dizziness pattern 41(16), it may be seen that the left/right bar pattern of the anti-dizziness pattern 41(14) and the left/right bar patterns of the anti-dizziness pattern 41(16) may be extended or shortened in response to lean state of the mobile vehicle, and the lengths of the left strip pattern and the right strip pattern may be different.

For example, when the mobile vehicle is in a left-turn state, the first display 110 may display the anti-dizziness pattern 41(18). Correspondingly, when the mobile vehicle is in a right-turning state, the first display 110 may display the anti-dizziness pattern 41(19). Comparing the anti-dizziness pattern 41(18) and the anti-dizziness pattern 41(19), it may be seen that the position of the sub-pattern sp moves in response to the turning state. For example, the sub-pattern sp in the anti-dizziness pattern 41(18) may react the left turn to move to the left, and the sub-pattern sp in the anti-dizziness pattern 41(19) may react the right turn to move to the right.

Referring to FIG. 4B, in an example, the anti-dizziness pattern may include blocks of different colors. When the mobile vehicle is stationary or moving steadily, the first display 110 may display the anti-dizziness pattern 41(20). In an embodiment, the anti-dizziness pattern 41(20) may include blocks of different colors. The left half part of the anti-dizziness pattern 41(20) is the first color, and the right half part of the anti-dizziness pattern 41(20) is the second color.

For example, when the mobile vehicle is in an acceleration state, the first display 110 may display the anti-dizziness patterns 41(21), 41(22), 41(23), 41(24), 41(25) or 41(26). Correspondingly, when the mobile vehicle is in a deceleration state, the first display 110 may display the anti-dizziness patterns 41(27), 41(28), 41(29), 41(30), 41(31) or 41(32). For example, when the mobile vehicle is in a left-leaning state, the first display 110 may display the anti-dizziness pattern 41(33) or 41(34). Correspondingly, when the mobile vehicle is in a right-leaning state, the first display 110 may display the anti-dizziness pattern 41(35) or 41(36). Comparing the anti-dizziness pattern 41(33) and the anti-dizziness pattern 41(35), it may be seen that the left bar pattern or the right bar pattern of the anti-dizziness pattern 41(33) and the anti-dizziness pattern 41(35) may become extended or shortened in response to the leaned state of the mobile device, and the length and color of the left strip pattern or the right strip pattern are different.

For example, when the mobile vehicle is in a left-turn state, the first display 110 may display the anti-dizziness pattern 41(37). Correspondingly, when the mobile vehicle is in a right-turning state, the first display 110 may display the anti-dizziness pattern 41(38). Comparing the anti-dizziness pattern 41(37) and the anti-dizziness pattern 41(38), it may be seen that the position of the color dividing line L1 moves in response to the turning state. The color dividing line L1 in the anti-dizziness pattern 41(37) may move to the right in response to leftward movement. The color dividing line L1 in the anti-dizziness pattern 41(38) may move to the left in response to the right turn.

Figure 5:
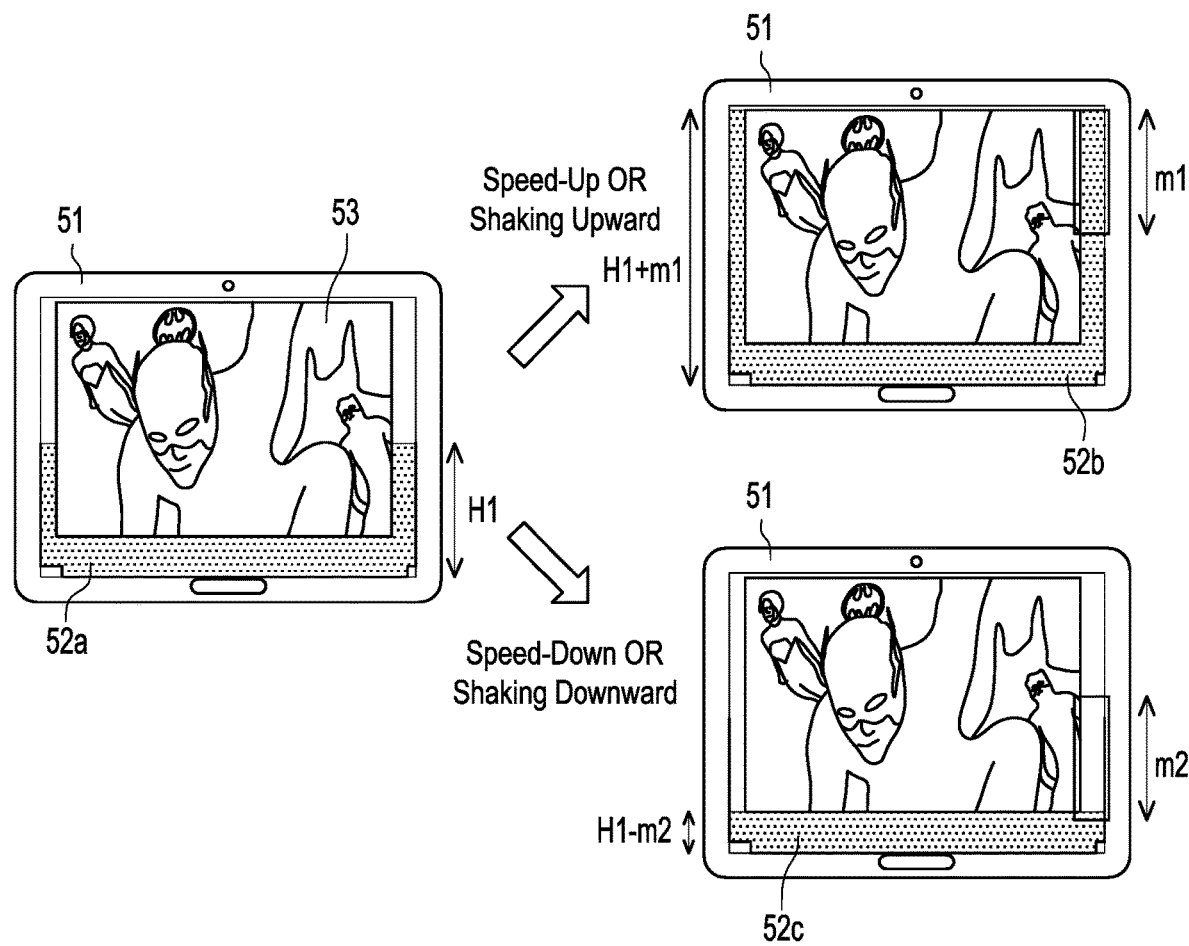
FIG. 5 is a schematic diagram illustrating the determination of pattern variation amount according to an exemplary embodiment of the disclosure.

FIG. 5 is a schematic diagram illustrating the determination of pattern variation amount according to an exemplary embodiment of the disclosure. With reference to FIG. 1A and FIG. 5, In an embodiment, the second display 120 for displaying the main screen 53 and the first display 110 for displaying the anti-dizziness patterns 52a, 52b and 52c are the same display device 51. The anti-dizziness patterns 52a, 52b and 52c may be displayed around or on at least one side of the main screen 53. The processing device 150 may determine the pattern variation amount of the anti-dizziness patterns 52b and 52c according to the transportation environment information.

When the mobile vehicle is in a stationary or stable driving state, the display device 51 may display the anti-dizziness pattern 52a. The length of the anti-dizziness pattern 52a is the preset length H1. When the mobile vehicle is in an acceleration state or an upward shaking state, the processing device 150 may determine the pattern variation amount according to the current acceleration value or shaking value of the mobile vehicle. Therefore, when the mobile vehicle is in an acceleration state or an upward shaking state, the length of the anti-dizziness pattern 52b displayed by the portable display device 51 is the preset length H1 plus the pattern variation amount m1. On the other hand, when the moving vehicle is in a deceleration state or a downward shaking state, the processing device 150 may determine the pattern variation amount m2 according to the current acceleration value or shaking value of the moving vehicle. Therefore, when the mobile vehicle is in a deceleration state or a downward shaking state, the length of the anti-dizziness pattern 52c displayed on the display device 51 is the preset length H1 minus the pattern variation amount m2 or plus the negative pattern variation amount m2.

In some embodiments, the processing device 150 may calculate the pattern variation amount $\Delta m$ according to the following equation (1) or equation (2).

$$\Delta m = (\text{acceleration value/maximum acceleration}) * \text{display width} * \text{correction coefficient} \quad (1)$$

$$\Delta m = (\text{shaking value/maximum shaking value}) * \text{display width} * \text{correction coefficient} \quad (2)$$

The processing device 150 may obtain the acceleration value or shaking value of the mobile vehicle through the transportation environment information acquisition device 130. The shaking value represents the displacement of the mobile vehicle up and down along an axis perpendicular to the ground plane. The maximum acceleration and maximum shaking values may respectively be preset values. The correction coefficient may be between 0 and 1, which may be set according to the actual application. It may be seen that the length of the anti-dizziness pattern may change with changes in speed or degree of shaking.

Figure 6:
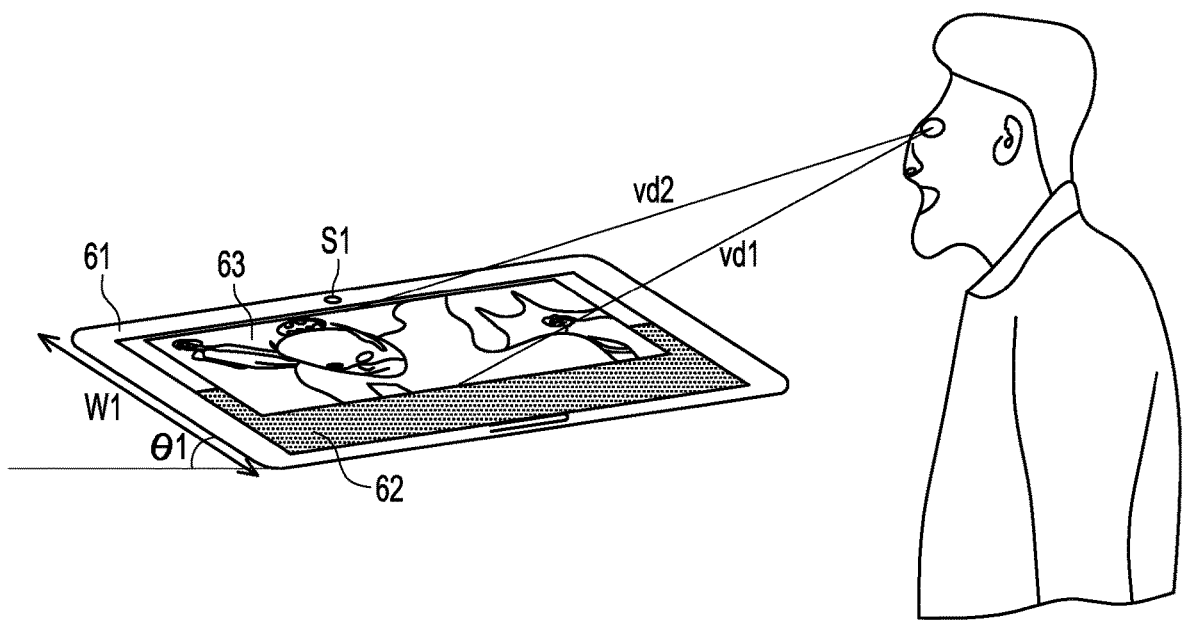
FIG. 6 is a schematic diagram of adjusting the pattern variation amount of the anti-dizziness pattern according to viewing distance information according to an exemplary embodiment of the disclosure.

FIG. 6 is a schematic diagram of adjusting the pattern variation amount of the anti-dizziness pattern according to viewing distance information according to an exemplary embodiment of the disclosure. With reference to FIG. 1A and FIG. 6, in an embodiment, the second display 120 for displaying the main screen 63 and the first display 110 for displaying the anti-dizziness pattern 62 are the same display device 61. The anti-dizziness pattern 62 may be displayed around or on at least one side of the main screen 63. The processing device 150 may determine the pattern variation amount of the anti-dizziness pattern 62 according to the transportation environment information. In addition, in some embodiments, in addition to determining the pattern variation amount according to transportation environment information, the processing device 150 adjusts the pattern variation amount of the anti-dizziness pattern according to the viewing distance information between the user's eyes and the main screen 63.

In an example of FIG. 6, the display posture detector 140 may detect the display posture of the display device 61. Here, the display posture of the display device 61 is the angle θ1 between the display plane of the display device 61 and the ground plane. The image sensor S1 of the display device 61 may be configured to detect the viewing distance information between the user's eyes and the main screen 63. When the user's eyes focus on the farthest part and the closest part of the main screen 63, the focal length of the eyes will be different. In other words, when the display posture of the display device 61 is a horizontal display posture, the focal plane of the eyes viewing the main screen 63 may demonstrate a significant difference. Therefore, the processing device 150 may further adjust the pattern variation amount according to the viewing distance information between the eyes and the main picture 63. The image sensor S1 may detect the viewing distance vd2 between the eyes and the farthest edge of the main screen 63 and the viewing distance vd1 between the eyes and the nearest edge of the main screen 63. For example, the processing device 150 may determine the pattern variation amount $\Delta m1$ according to $\Delta m$ of equation (2) and the following equation (4).

$$\Delta m1 = \Delta m * (\text{distance of the farthest focal plane}/50) * \quad (4)$$
$$(1\ \cos\theta1)/2 * (1 + \text{display position/monitor width})/2$$

Wherein, the distance of the farthest focal plane is the viewing distance vd2, the display width is W1, and the display position is the display position of the anti-dizziness pattern 62 (such as pixel coordinate position). Generally, the focal plane distance that the human eye may see clearly is about 50 centimeters. It may be seen that the image length of the anti-dizziness pattern may change with the distance from the focal plane of the eye and the display posture. In addition, when the display position of the anti-dizziness pattern 62 is farther away from the human eye, the pattern variation amount of the anti-dizziness pattern 62 may be larger. On the contrary, when the display position of the anti-dizziness pattern 62 is closer to the human eye, the pattern variation amount of the anti-dizziness pattern 62 may be smaller.

Figure 7:
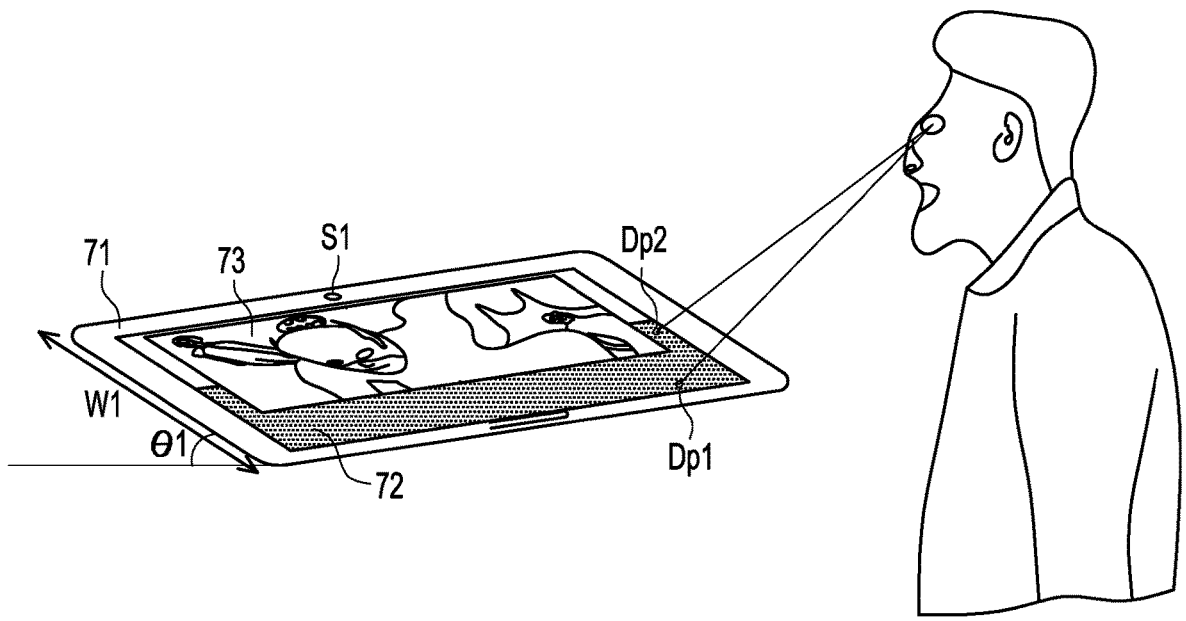
FIG. 7 is a schematic diagram illustrating determining pattern brightness of an anti-dizziness pattern according to an exemplary embodiment of the disclosure.

FIG. 7 is a schematic diagram illustrating determining the pattern brightness of an anti-dizziness pattern according to an exemplary embodiment of the disclosure. With reference to FIG. 1A and FIG. 7, in an embodiment, the second display 120 for displaying the main screen 73 and the first display 110 for displaying the anti-dizziness pattern 72 are the same display device 71. The anti-dizziness pattern 72 is displayed around or on at least one side of the main screen 73. The processing device 150 may determine the pattern variation amount of the anti-dizziness pattern 72 according to the transportation environment information.

In addition, in some embodiments, the display posture detector 140 is configured to detect the display posture of the second display 120 (i.e., the display device 71). Here, the display posture of the display device 71 is the angle $\theta1$ between the display plane of the display device 71 and the ground plane. The processing device 150 may determine the pattern brightness of the anti-dizziness pattern 72 according to the display posture of the second display 120.

When the display orientation of the portable display device 71 is a horizontal display posture, the eyes experience different brightness when viewing different parts of the portable display device 71. Therefore, in some embodiments, the processing device 150 may determine the brightness of each sub-pattern unit according to the display position (e.g., the display positions Dp1 and Dp2) of each sub-pattern unit of the anti-dizziness pattern 72. The sub-pattern unit is, for example, a pixel unit or a pattern partition block. The sub-pattern units that are farther away from the user may have a brighter display brightness, and the sub-pattern units that are closer to the user may have a darker display brightness to compensate for differences in brightness perception caused by human vision due to viewing distance. For example, the processing device 150 may determine the pattern brightness Y1 of the anti-dizziness pattern 72 according to the following equation (5).

$$Y1 = \text{Set display brightness} * (1\ \cos\theta1)/2 * \quad (5)$$
$$(1\ \text{display position/monitor width})/2 * \text{correction coefficient}$$

The set display brightness may be a default preset brightness, and the display position is the display position (e.g., pixel coordinate position) of the sub-pattern unit of the anti-dizziness pattern 72. The correction coefficient may be between 0 and 1, which may be set according to the actual application.

Figure 8:
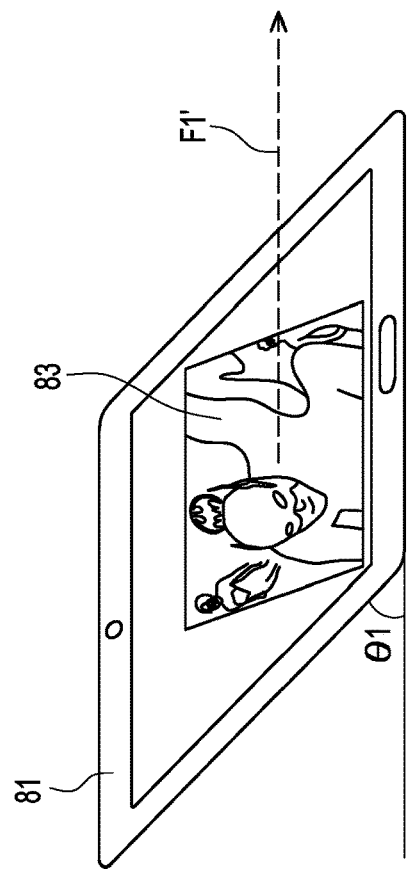
FIG. 8 is a schematic diagram of image deformation transformation on a display image according to an exemplary embodiment of the disclosure.
Figure 8:
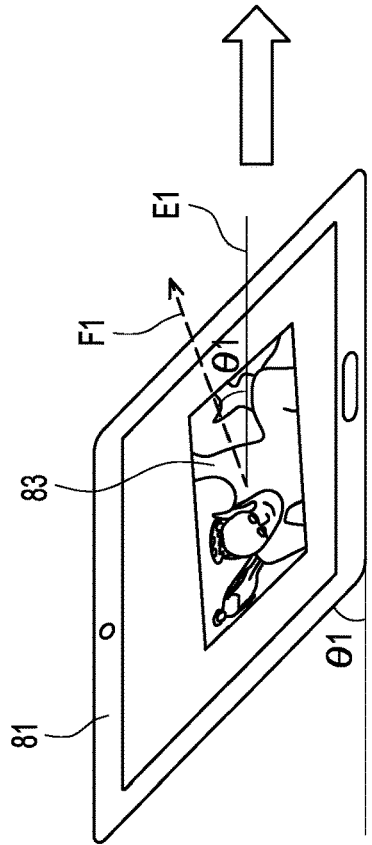

FIG. 8 is a schematic diagram of image deformation transformation on a display image according to an exemplary embodiment of the disclosure. With reference to FIG. 1B and FIG. 8, in an embodiment, the first display 110 configured to display the main screen 83 is, for example, a portable display device. The processing device 150 may determine the pattern deformation amount of the main screen 83 according to the transportation environment information and the display posture of the first display 110.

The display posture detector 140 may be configured to detect the display posture of the first display 110 (i.e., the display device 81). Here, the display posture of the display device 81 is the angle $\theta1$ between the display plane of the display device 81 and the ground plane. The processing device 150 may determine the angle difference $\theta1$ between the display orientation F1 of the first display 110 and the user's line of sight E1 according to the display posture of the first display 110. The display orientation F1 of the first display 110 may represent the image normal vector of the main picture 83 before deformation. Then, the processing device 150 may control the display image of the first display 110 (i.e., the main screen 83) by performing image deformation transformation according to the angle difference $\theta1$, so that the image normal vector F1' of the deformed main screen 83 is parallel to the user's line of sight E1. The image deformation transformation is, for example, affine transformation or perspective transformation.

Figure 9:
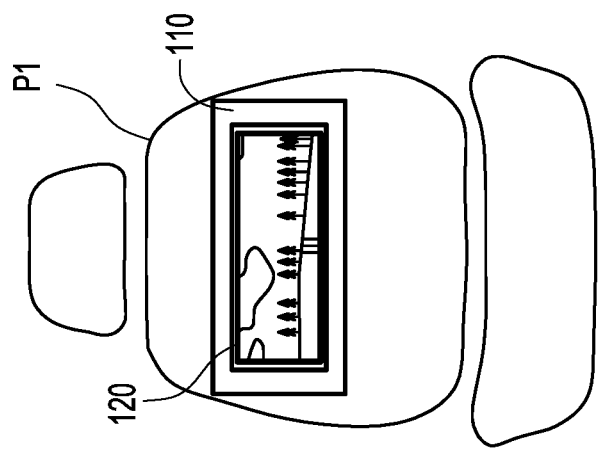
FIG. 9 is a schematic diagram of a first display and a second display according to an exemplary embodiment of the disclosure.
Figure 9:
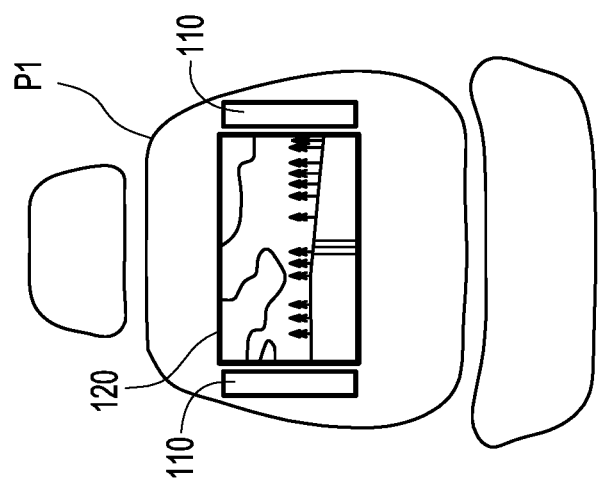
Figure 9:
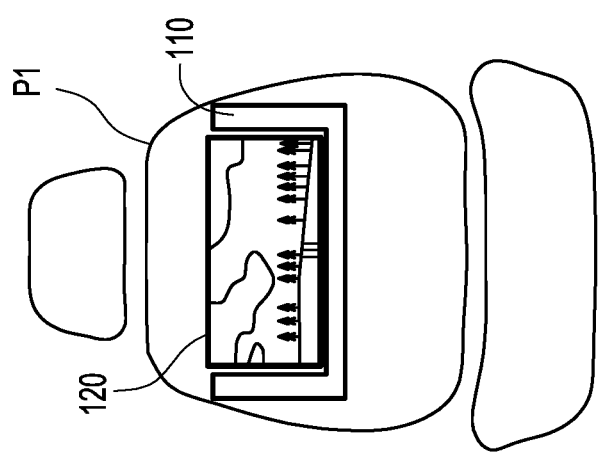

FIG. 9 is a schematic diagram of a first display and a second display according to an exemplary embodiment of the disclosure. Referring to FIG. 1A and FIG. 9, in an embodiment, the first display 110 may be configured to display the anti-dizziness pattern, and the second display 120 may be configured to display the main screen. The first display 110 and the second display 120 may be disposed on the back of the seat P1 of the mobile vehicle for viewing by passengers.

In some embodiments, the first display 110 and the second display 120 may be the same display device. As shown in FIG. 9, the anti-dizziness pattern may be substantially U-shaped, for example, and the display device includes a U-shaped edge display area for displaying the anti-dizziness pattern. Alternatively, the anti-dizziness pattern may be substantially, for example, a plurality of strips, and then the display device includes a plurality of strip-shaped edge display areas for displaying the anti-dizziness pattern. Alternatively, the anti-dizziness pattern may be a rectangle border, and then the display device includes a rectangle border display area for displaying the anti-dizziness pattern.

In some embodiments, the first display 110 and the second display 120 may be different display devices. The first display 110 may be disposed adjusted to at least one display edge of the second display 120. As shown in FIG. 9, the anti-dizziness pattern may be roughly U-shaped, for example, and the first display 110 may be disposed next to the left and right display edges and the lower edge of the display of the second display 120. Alternatively, the anti-dizziness pattern may be substantially in the form of a plurality of strips, and the first display 110 may be disposed next to the left and right display edges of the second display 120. Alternatively, the anti-dizziness pattern may be a rectangle border, for example, and the first display 110 may be disposed next to the left and right display edges and the upper and lower display edges of the second display 120. In different embodiments, the first display 110 configured to display the anti-dizziness pattern may be an external light bar display device or a display panel applying various display technologies. For example, the first display 110 may be a U-shaped, strip-shaped, mouth-shaped or other shaped light bar or LED display matrix, etc.

Figure 10:
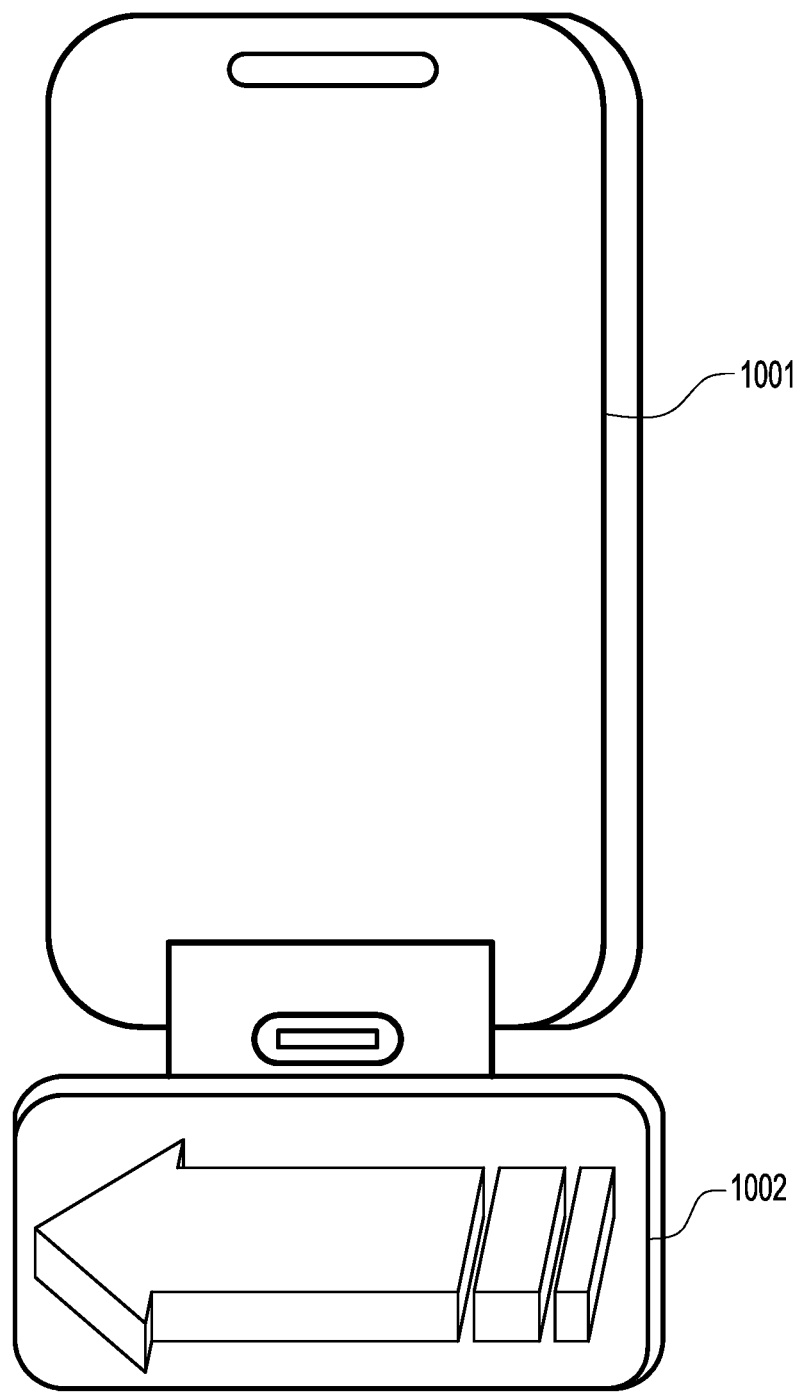
FIG. 10 is a schematic diagram of a portable display device and an anti-dizziness display module according to an exemplary embodiment of the disclosure.

FIG. 10 is a schematic diagram of a portable display device and an anti-dizziness display module according to an exemplary embodiment of the disclosure. Referring to FIG. 1A and FIG. 10, in an embodiment, the first display 110 may be configured to display the anti-dizziness pattern, and the second display 120 may be configured to display the main screen. The second display 120 is a portable display device 1001, and the portable display device 1001 is connected to an external device 1002 including the first display 110 through a transmission interface. The transmission interface is, for example, a USB transmission interface or other wired or wireless transmission interface. In other words, the external device 1002 for displaying anti-dizziness patterns may be connected to the portable display device 1001 through a plug-and-play interface. Alternatively, the external device 1002 for displaying anti-dizziness patterns may be connected to the portable display device 1001 through a wireless short-range transmission interface (such as a Bluetooth interface). The external device 1002 may be fixed on one side of the portable display device 1001 through a socket component, a plug component, a magnetic component or other connecting components. In some embodiments, the external device 1002 for displaying the anti-dizziness pattern may be mounted on the seat back of the mobile vehicle.

Figure 11:
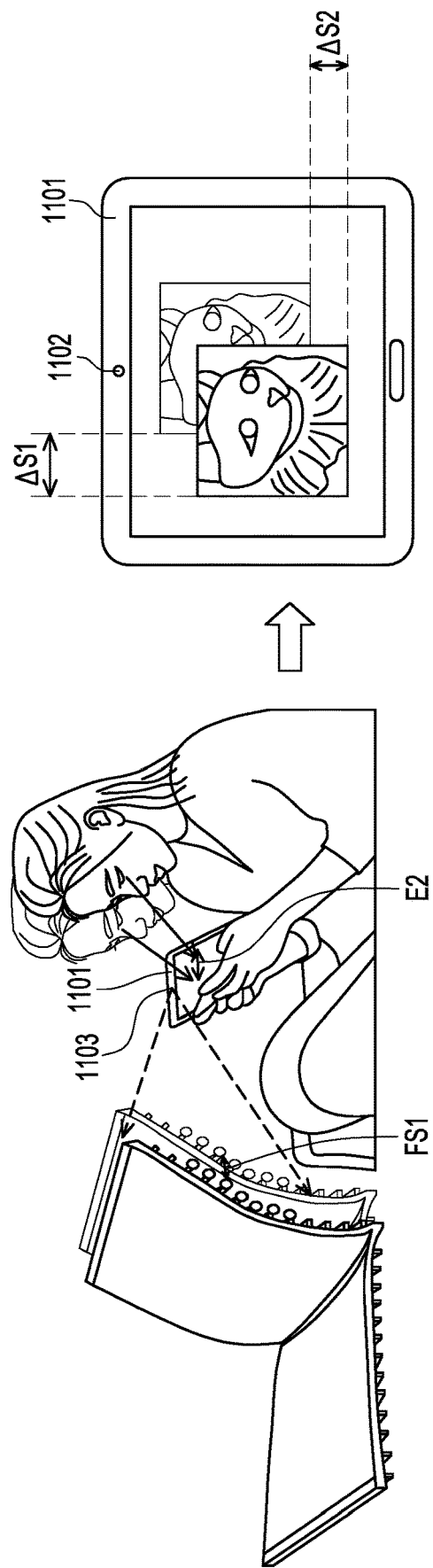
FIG. 11 is a schematic diagram of determining the image offset amount and adjusting the position of the display image according to an exemplary embodiment of the disclosure.

FIG. 11 is a schematic diagram of determining the image offset amount and adjusting the position of the display image according to an exemplary embodiment of the disclosure. With reference to FIG. 1B and FIG. 11, in an embodiment, the first display 110 configured to display the main screen is, for example, a portable display device 1101. The processing device 150 may determine the image offset amounts $\Delta S1$ and $\Delta S2$ of the main screen according to the transportation environment information.

With reference to FIG. 11, in some embodiments, the information display system 200 further includes a first image sensor 1102 for obtaining gaze information of a user. The first image sensor 1102 may be disposed on the portable display device 1101. The first image sensor 1102 is, for example, the front lens of the portable display device 1101. The first image sensor 1102 may sense the user to generate a user image when the user is viewing the displayed content. The processing device 150 may utilize the first image sensor 1101 to obtain the gaze information of a user. Furthermore, the processing device 150 may obtain the gaze information of a user according to the user image generated by the first image sensor 1101. The gaze information includes the sight offset E2 between the two gaze points at different time points. The sight offset E2 may include offsets in different vertical axes.

In addition, the transportation environment information acquisition device 130 may include an inertial sensor and a second image sensor 1103 installed on the portable display device 1101. The second image sensor 1103 may be, for example, a rear lens of the portable display device 1101. The second image sensor 1103 may sense the vehicle interior scene inside the mobile vehicle to generate the vehicle interior scene when the user views the display content. image. The processing device 150 uses the second image sensor 1103 to detect the shaking state of the portable display device 1101. Furthermore, the processing device 150 may obtain the shaking state of the mobile vehicle according to the internal image of the vehicle generated by the second image sensor 1103.

In some embodiments, the processing device 150 performs feature point extraction on the first image and the second image captured by the second image sensor 1103 at different times. A feature point extraction algorithm may include Scale Invariant feature transformation (SIFT) algorithm or Speeded Up Robust Features (SURF) algorithm, etc. By comparing the plurality of feature points of the first image with the plurality of feature points of the second image, the processing device 150 may calculate the shaking state of the portable display device 1101. The processing device 150 may perform feature matching on the first image and the second image. According to the coordinate differences of the feature points that match each other, the processing device 150 may estimate the shaking state of the portable display device 1101. The shaking state of the portable display device 1101 includes feature point offsets FS1 at different time points. The feature point offset FS1 may include offsets in different vertical axes.

The processing device 150 may use an inertial sensor to obtain the shaking state of the mobile vehicle. Furthermore, the processing device 150 may calculate the shaking distance of the mobile vehicle along the reference direction (the X-axis, Y-axis or Z-axis of the reference coordinate system) according to the sensing value of the inertial sensor of the portable display device 1101.

Then, the processing device 150 may determine the image offset amounts $\Delta S1$ and $\Delta S2$ of the display image of the portable display device 1101 (i.e., the first display 110) according to the gaze information, the shaking state of the mobile vehicle, and the shaking state of the portable display device 1101. Therefore, the processing device 150 may control the main screen to shift along the display X-axis direction by the image offset amount $\Delta S1$, and control the main screen to shift along the display Y-axis direction by the image offset amount $\Delta S2$. As shown in FIG. 11, the display content moves to the lower left corner of the display area, for example. However, due to the deviation of the user's line of sight, the shaking of the mobile vehicle, and the shaking of the portable display device 1101, the relative positional relationship between the user's line of sight and the displayed content may be maintained substantially consistent.

For example, the image offset amount amounts $\Delta S1$ and $\Delta S2$ may be calculated according to the following equation (6).

$$\text{Image offset amount} = \text{(feature point offset} - \text{line of sight offset)} * \text{human factors coefficient} + \text{shaking value of mobile vehicle} \quad (6)$$

wherein the human factors coefficient may be set according to user information, and may range from 0.5 to 2, for example.

Furthermore, in some embodiments, the information display system 100 or 200 may further include a user information acquisition device for acquiring user information. The user information acquisition device is, for example, an image sensor, an eye tracking device or an information input device, etc. The above user information is, for example, user location, user eye information or other dynamic user information. User information may also include the user's age, gender, height, or other static user information. The processing device 150 may determine the visual feedback magnitude according to user information and transportation environment information. For example, the human factor coefficient of equation (6) may be determined according to user information. For example, the user's age may be negatively correlated with the human factor coefficient. In other words, the older the user, the smaller the human factors coefficient. Alternatively, the user's interpupillary distance may have a positive correlation with the human factor coefficient. That is, the smaller the user's interpupillary distance, the smaller the human factors coefficient.

FIG. 12A and FIG. 12B are schematic diagrams illustrating a scenario of displaying an anti-dizziness pattern according to an exemplary embodiment of the disclosure. With reference to FIG. 1B and FIG. 12A, in an embodiment, the first display 110 configured to display the main screen may be a projection display device installed in the mobile vehicle. The processing device 150 may determine the visual feedback magnitude of the display image of the projection display device according to the transportation environment information. For example, the visual feedback magnitude may be the tilt state or area size of the anti-dizziness pattern.

In the application scenario of FIGS. 12A and 12B, the display image of the first display 110 may include a first projection image projected on the side window SW1 and a second projection image projected on the rear window BW1. The first projected image on the side window SW1 and the second projected image on the rear window BW1 may change in response to variation of the transportation environment information. In an embodiment, the window surface of the side window SW1 is substantially parallel to the traveling direction of the mobile vehicle, and the window surface of the rear window BW1 is substantially perpendicular to the traveling direction of the mobile vehicle.

For example, with reference to FIG. 12B, when the mobile vehicle is moving on a downhill road, the processing device 150 may control the first display 110 to project the first projection image 1202 on the side window SW1 and/or control the first display 110 to project the second projection image 1201 on the rear window BW1. When the mobile vehicle is moving on a flat road section, the processing device 150 may control the first display 110 to project the first projection image 1204 on the side window SW1 and/or control the first display 110 to project the second projection image 1203 on the rear window BW1. When the mobile vehicle is moving on an uphill road, the processing device 150 may control the first display 110 to project the first projection image 1206 on the side window SW1 and/or control the first display 110 to project the second projection image 1205 on the rear window BW1. As the transportation environment information changes, the tilt state or area size of the anti-dizziness patterns in these projected images may change accordingly.

However, FIG. 12A and FIG. 12B are an example of projecting an anti-dizziness pattern on a window on a moving vehicle. Alternatively, in other embodiments, the projection display device (i.e., the first display 110) disposed in the mobile vehicle may project the anti-dizziness pattern on the side wall or rear wall of the mobile vehicle. In other words, the display image of the first display 110 may include a first projection image projected on the side wall of the mobile vehicle and a second projection image projected on the rear wall of the mobile vehicle. The anti-dizziness pattern presented on the side wall and the rear wall may be changed in a manner similar to the embodiments illustrated in FIG. 12A and FIG. 12B.

FIG. 13 is a schematic diagram of adjusting the position of the display image according to transportation environment information according to an exemplary embodiment of the disclosure. With reference to FIG. 1B and FIG. 13, in an embodiment, the first display 110 configured to display the main screen is a display device installed in the mobile vehicle. The processing device 150 may determine the offset direction of the display image of the first display 110 according to the transportation environment information, and control the display image of the first display 110 to shift along the offset direction.

As shown in FIG. 13, when the traveling path of the mobile vehicle is the straight path 1301, the processing device 150 may center the display image of the first display 110. When the traveling path of the mobile vehicle is the left turn path 1302, the processing device 150 may determine the right offset direction D1 according to the left turn path 1302, and control the display image of the first display 110 to move along the right offset D1. When the traveling path of the mobile vehicle is the right turn path 1303, the processing device 150 may determine the left offset direction D2 according to the right turn path 1303, and control the display image of the first display 110 to move along the left offset direction D2. When the traveling path of the moving vehicle is the bumpy path 1304, the processing device 150 may determine the downward deflection offset D3 according to the bumpy path 1304, and control the display image of the first display 110 to move along the downward offset direction D3.

FIG. 14 is a schematic diagram of determining the visual feedback magnitude according to future transportation environment information according to an exemplary embodiment of the disclosure. With reference to FIG. 1A, FIG. 1B and FIG. 14, in an embodiment, the transportation environment information acquisition device 130 may include a navigation and positioning device 1401 and a wheel front information sensing device 1402 installed on the mobile vehicle V1. The navigation and positioning device 1401 may provide the current location and navigation path information of the mobile vehicle V1. The wheel front information sensing device 1402 may include an infrared sensor or a lidar, etc. The wheel front information sensing device 1402 may generate road surface perception data of the road in front of the mobile vehicle V1. In other words, the transportation environment information may include navigation path information, the current position of the mobile vehicle V1 and road surface perception data.

In operation 1403, the processing device 150 may predict the future transportation environment information (such as potholes, bumps, or uphill and downhill) of the mobile vehicle V1 at a future time point according to the navigation path information, the current position of the mobile vehicle V1 and the road surface perception data. In operation 1404, the processing device 150 may determine the visual feedback magnitude according to future transportation environment information. Therefore, the processing device 150 may control the display image of the first display 110 according to the visual feedback magnitude in advance, so that the user may immediately perceive the variation of the transportation environment information through the display image of the first display 110, thereby reducing the time spent viewing the display in the mobile vehicle. dizziness.

The anti-dazzling display method, the processing device and the information display system in the exemplary embodiments of the disclosure may provide visual feedback according to the transportation environment information of the mobile vehicle to improve the dizziness of users riding the mobile vehicle while viewing the display. In addition, the anti-dizziness pattern may not obstruct the display content of interest to the user, thereby improving the user's viewing experience.

Although the disclosure has been disclosed above in the form of exemplary embodiments, The is not intended to limit the disclosure. Anyone with ordinary knowledge in the relevant technical field may make slight changes and modifications without departing from the spirit and scope of the disclosure. Therefore, the protection scope of the disclosure shall be determined by the appended patent application scope and its equivalent scope.

What is claimed is:

1. An information display system for displaying on a mobile vehicle, comprising:
    a first display;
    a second display configured to display a main screen;
    a display posture detector configured to detect a display posture of the second display;
    a transportation environment information acquisition device configured to acquire transportation environment information of the mobile vehicle;
    a processing device, connected to the first display, the second display and the transportation environment information acquisition device, and configured to:
        determine a visual feedback magnitude according to the transportation environment information, wherein the visual feedback magnitude varies in response to variation of the transportation environment information; and
        control a display image of the first display according to the visual feedback magnitude, so that the display image of the first display changes in response to the variation of the transportation environment information,
    wherein the display image of the first display comprises an anti-dizziness pattern, the anti-dizziness pattern is displayed around the main screen or displayed on at least one side of the main screen, the visual feedback magnitude comprises a pattern variation amount of the anti-dizziness pattern, and the processing device is further configured to:
    determine the pattern variation amount of the anti-dizziness pattern according to the transportation environment information, wherein the pattern variation amount of the anti-dizziness pattern comprises a pattern length variation amount or a pattern angle variation amount;
    determine a pattern shape or brightness of the anti-dizziness pattern according to the display posture of the second display, wherein the display posture of the second display comprises an angle between display surface of the second display and a ground plane; and
    control the first display to display the anti-dizziness pattern around the main screen or on at least one side of the main screen according to the pattern variation amount while the second display displaying the main screen.

2. The information display system according to claim 1, wherein the processing device is configured to:
    adjust the pattern variation amount of the anti-dizziness pattern according to a viewing distance information between user's eyes and the main screen.

3. The information display system according to claim 1, wherein the first display and the second display are the same display device.

4. The information display system according to claim 1, wherein the first display and the second display are different display devices.

5. The information display system according to claim 4, wherein the first display is disposed adjacent to at least one display edge of the second display.

6. The information display system according to claim 5, wherein the second display is a portable display device, and the portable display device is connected to an external device comprising the first display through a transmission interface.

7. An information display system according to claim 1, wherein the transportation environment information acquisition device comprises an inertial sensor, an image sensor, or a navigation and positioning device, the transportation environment information comprises shaking state, speed state, turning direction, lean state, road surface state, navigation path information, or a current location of the mobile vehicle.

8. The information display system according to claim 7, wherein the transportation environment information acquisition device further comprises a wheel front information sensing device, the transportation environment information comprises road surface perception data, and the processing device is configured to:
    predict future transportation environment information of the mobile vehicle at a future time point according to the navigation path information, the current location of the mobile vehicle, and the road surface perception data; and
    determine the visual feedback magnitude according to the future transportation environment information.

9. The information display system according to claim 1, wherein the transportation environment information acquisition device comprises a wireless communication device, and the wireless communication device receives the transportation environment information of the mobile vehicle.

10. The information display system according to claim 1, wherein the visual feedback magnitude comprises an image offset amount of the display image of the first display, and the processing device is configured to:
    determine the image offset amount of the display image of the first display according to the transportation environment information; and
    control the display image of the first display to shift according to the image offset amount.

11. The information display system of claim 10, wherein the processing device is configured to:
    determine an offset direction of the display image of the first display according to the transportation environment information; and
    control the display image of the first display to shift along the offset direction.

12. The information display system according to claim 10, further comprising a first image sensor installed on a portable display device, and the transportation environment information acquisition device comprises an inertial sensor and a second image sensor installed on the portable display device, and the processing device is configured to:
- obtain gaze information of a user by using the first image sensor;
- obtain shaking state of the mobile vehicle by using the inertial sensor;
- detect shaking state of the portable display device by using the second image sensor; and
- determine the image offset amount of the display image of the first display according to the gaze information, the shaking state of the mobile vehicle, and the shaking state of the portable display device.

13. The information display system according to claim 12, wherein the processing device is configured to:
- perform feature point extraction on a first image and a second image captured by the second image sensor at different times; and
- calculate the shaking state of the portable display device through comparing a plurality of feature points of the first image with a plurality of feature points of the second image.

14. The information display system according to claim 1, further comprising a display posture detector configured to detect a display posture of the first display, wherein the processing device is configured to:
- determine an angle difference between a display orientation of the first display and line of sight of a user according to the display posture of the first display; and
- control the display image of the first display by performing image deformation transformation according to the angle difference.

15. The information display system according to claim 1, further comprising a user information acquisition device configured to acquire user information, wherein the processing device is configured to:
- determine the visual feedback magnitude according to the user information and the transportation environment information.

16. An anti-dizziness display method, adapted to an information display system comprising a first display and a second display, wherein the information display system configured to display on a mobile vehicle and the second display is configured to display a main screen, and the method comprises:
- obtaining transportation environment information of the mobile vehicle;
- determining a visual feedback magnitude according to the transportation environment information, wherein the visual feedback magnitude varies in response to variation of the transportation environment information; and
- controlling a display image of the first display according to the visual feedback magnitude, so that the display image of the first display changes in response to the variation of the transportation environment information, wherein the display image of the first display comprises an anti-dizziness pattern, the anti-dizziness pattern is displayed around the main screen or displayed on at least one side of the main screen, the visual feedback magnitude comprises a pattern variation amount of the anti-dizziness pattern, and the method further comprises:
- determining the pattern variation amount of the anti-dizziness pattern according to the transportation environment information, wherein the pattern variation amount of the anti-dizziness pattern comprises a pattern length variation amount or a pattern angle variation amount;
- detecting a display posture of the second display;
- determining a pattern shape or brightness of the anti-dizziness pattern according to the display posture of the second display, wherein the display posture of the second display comprises an angle between display surface of the second display and a ground plane; and
- controlling the first display to display the anti-dizziness pattern around the main screen or on at least one side of the main screen according to the pattern variation amount while the second display displaying the main screen.

17. A processing device connected to a first display and a second display, wherein the first display is configured to display on a mobile vehicle, the second display is configured to display a main screen, and the processing device comprises:
- a memory configured to store data; and
- a processor connected to the memory and configured to:
  - obtain transportation environment information of the mobile vehicle;
  - determine a visual feedback magnitude according to the transportation environment information, wherein the visual feedback magnitude varies in response to variation of the transportation environment information; and
  - control a display image of the first display according to the visual feedback magnitude, so that the display image of the first display changes in response to the variation of the transportation environment information, wherein the display image of the first display comprises an anti-dizziness pattern, the anti-dizziness pattern is displayed around the main screen or displayed on at least one side of the main screen, the visual feedback magnitude comprises a pattern variation amount of the anti-dizziness pattern, and the processor is further configured to:
- determine the pattern variation amount of the anti-dizziness pattern according to the transportation environment information, wherein the pattern variation amount of the anti-dizziness pattern comprises a pattern length variation amount or a pattern angle variation amount;
- detect a display posture of the second display;
- determine a pattern shape or brightness of the anti-dizziness pattern according to the display posture of the second display, wherein the display posture of the second display comprises an angle between display surface of the second display and a ground plane; and
- control the first display to display the anti-dizziness pattern around the main screen or on at least one side of the main screen according to the pattern variation amount while the second display displaying the main screen.

* * * * *